A. MELZER.
ANIMAL AMBULANCE.
APPLICATION FILED OCT. 24, 1910.
1,019,268.
Patented Mar. 5, 1912.
2 SHEETS—SHEET 2.
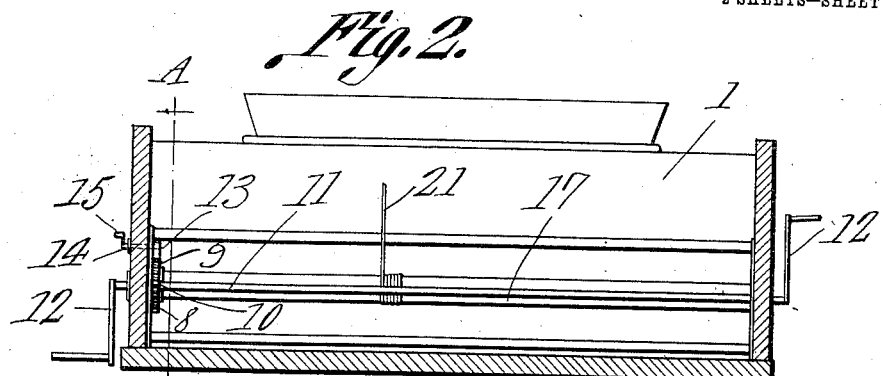
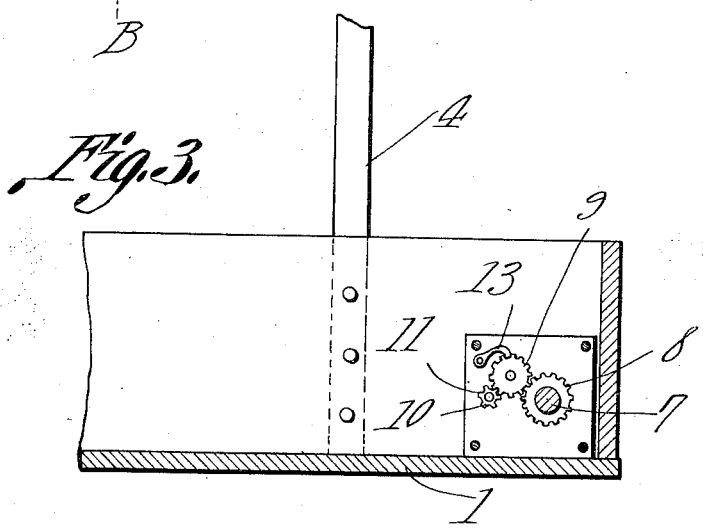
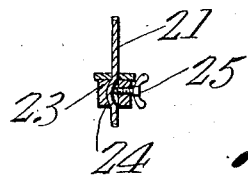
Adolph Melzer,
Inventor
Witnesses
by C. A. Snow & Co.
Attorneys
COLUMBIA PLANOGRAPH CO., WASHINGTON, D. C.

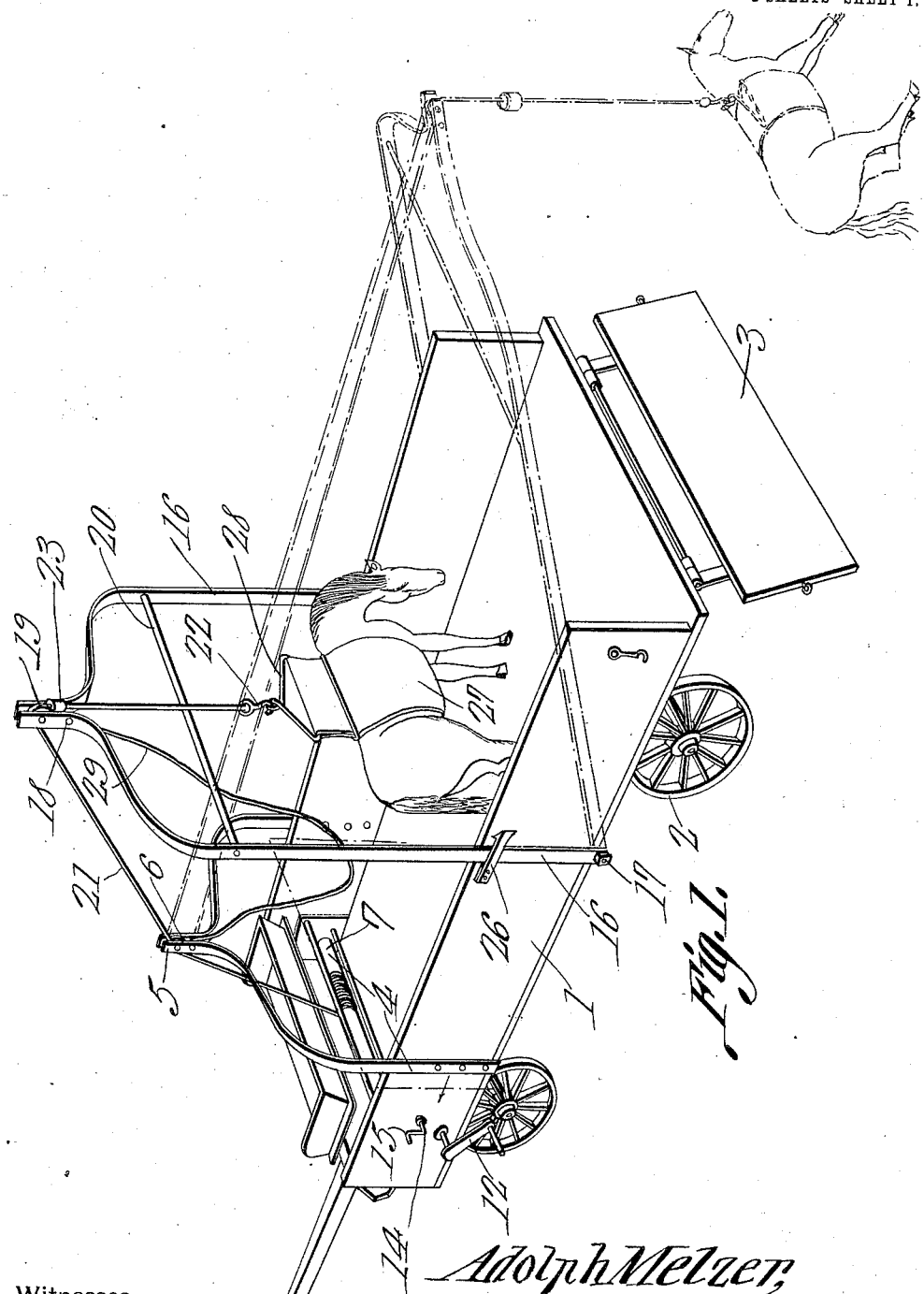

UNITED STATES PATENT OFFICE.

ADOLPH MELZER, OF EVANSVILLE, INDIANA.

ANIMAL-AMBULANCE.

1,019,268.  Specification of Letters Patent.  Patented Mar. 5, 1912.

Application filed October 24, 1910. Serial No. 588,773.

*To all whom it may concern:*

Be it known that I, ADOLPH MELZER, a citizen of the United States, residing at Evansville, in the county of Vanderburg and State of Indiana, have invented a new and useful Animal-Ambulance, of which the following is a specification.

This invention relates to ambulances for use in handling and transporting horses and other large animals.

Devices of this character such as heretofore constructed have utilized inclines leading to the bottom of the ambulance body and up which the animals are to be drawn. Other types employ conveyers partly supported by the vehicle and partly by a supplemental structure designed to be set up upon the ground. Both of these types have been found objectionable, the first, primarily, because of the injury liable to be inflicted upon the animal while being hauled up the incline, and the great power necessary to perform the operation, while the second type has been found objectionable because it has been necessary to set up a supplemental structure, this not always being possible because of the position in which the animal is lying.

One of the objects of the present invention is the provision of mechanism carried solely by the vehicle at all times and whereby, during one operation of the actuating element, the animal may be successively hoisted to a desired elevation and then conveyed to a position above the floor of the vehicle.

A further object is to provide mechanism of this character which can be quickly adjusted to working position and which can be used efficiently for the purpose of placing the animal upon its feet should it be deemed unnecessary to transport it in the ambulance.

With the foregoing and other objects in view which will appear as the description proceeds the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings:—Figure 1 is a perspective view of the ambulance in use, the positions of the parts during the initial portion of the hoisting operation being illustrated by dotted lines. Fig. 2 is a vertical transverse section through the front portion of the ambulance body. Fig. 3 is a section on line A—B Fig. 2. Fig. 4 is a section through the adjustable stop.

Referring to the figures by characters of reference 1 designates the ambulance body which may be of any desired proportions and is mounted on the usual or any desired form of running gear such as indicated at 2. The rear end of the body is adapted to be closed by a hinged tail board 3 having suitable means, such as hook and eye for securing it in closed position.

The mechanism constituting the present invention is carried solely by the ambulance body and includes a yoke 4 extending across the front portion of the body and having an upstanding intermediate portion 5 supporting a guide sheave 6. A winch 7 extends transversely of the front portion of the body 1 and has a gear 8 designed to receive motion, through a gear 9 from a gear 10 secured to a transversely extending shaft 11. A crank 12 may be attached to each end of the shaft, although, if preferred, only a single crank may be utilized. The gear 9 is adapted to be engaged by a dog 13 having a stem 14 mounted for rotation within the side of the body 1 and provided with an arm 15 whereby the dog can be readily moved into or out of engagement with the gear 9. It will be apparent that by utilizing gears such as shown and described power will be greatly multiplied in its transmission from the cranks 12 to the winch.

A hoisting element is carried by the body 1 at a point preferably in front of the rear wheels of the running gear, this element, in the present instance, being made up of side beams 16 pivotally connected to the sides of the body 1 as at 17, and having their upper ends converging upwardly and secured together, as shown at 18. A guide sheave 19 is journaled between the upper end portions of the side beams, and one or more braces 20 may be interposed between these beams so as to properly connect them.

A hoisting cable 21 is mounted on the sheaves 6 and 19 and one end thereof is secured to the winch 7 while its other end carries a hook 22. A stop 23 is mounted on the cable at a point between the sheave 19 and the hook 22. This stop may be of any construction desired. In Fig. 4 one form has been illustrated. In this instance the stop consists of a block having a curved passage 24 through which the cable extends, there being a set screw 25 carried by the block and designed to bind it against the wall of the passage so as to hold the cable against sliding movement within the block. Spring catches 26, or the like, may be attached to the sides of the body 1, these being so located as to be engaged by the beams 16, when they assume positions perpendicular to the bottom of the body.

In using the apparatus any suitable form of harness may be employed. In the drawings a broad band 27 has been shown, this band being adapted to be secured about the body of the animal and having a loop 28 for engagement with the hook 22. This band is first placed about the animal and with the loop 28 adjacent its back. Side beams 16 are released from the catches 26 and swung rearwardly and downwardly so that the sheave 19 will be supported directly over the animal. Hook 22 is placed in engagement with the loop 28 and stop 23 is adjusted along the cable until the distance between the stop and the hoofs of the animal is less than the distance between the floor of the body 1 and the sheave 19. A retaining cable 29 is attached to the beams 16 and to the yoke 4 and serves to limit the swinging movement of the beams when they are lowered. After the hook 22 has been attached to the harness, dog 13 is elevated and the winch is rotated so as to wind the cable 21 thereupon. The animal will thus be elevated and, should it be deemed unnecessary to transport it, it can be placed upon its feet and the harness then removed. In order to place the animal in the vehicle, the winding of the cable 21 is continued so as to bring the stop 23 against the upper ends of the side beams 16, whereupon said stop will cause the beams to swing upwardly to the position shown in full lines in Fig. 1. The animal will therefore be elevated above the bottom of the body, and, as soon as the side beams become engaged by the catches 26 the cable may be unwound so as to lower the animal to the bottom of the vehicle body. The parts are thus reset, and when it is desired to repeat the foregoing operation it becomes merely necessary to release the side beams in the manner hereinbefore described.

What is claimed is:—

An animal ambulance including a vehicle body, side beams pivotally connected to the sides of the body at the bottom thereof and at points between the front and rear supporting wheels of the body, the upper ends of said beams converging upwardly, a guide sheave journaled between the upper end portions of said beams, a yoke fixedly connected to the front portion of the body, a flexible connection between the upper end portions of the beams and the yoke, a guide sheave carried by the yoke, an animal engaging band, a flexible hoisting element detachably engaging the band and mounted on the sheaves, a stop device carried by said element and movable against one of the sheaves to elevate the beams when said element is moved in one direction, means carried by the front portion of the body for winding said element, and means for automatically engaging the beams to lock them when elevated.

In testimony that I claim the foregoing as my own, I have hereto affixed my signature in the presence of two witnesses.

ADOLPH MELZER.

Witnesses:
 F. B. OCHSENREITER,
 HERBERT D. LAWSON.

---

Copies of this patent may be obtained for five cents each, by addressing the "Commissioner of Patents, Washington, D. C."